Jan. 30, 1923.
D. H. NASH.
TRANSMISSION DRIVE FOR SPEEDOMETERS.
FILED MAR. 10, 1922.
1,443,848
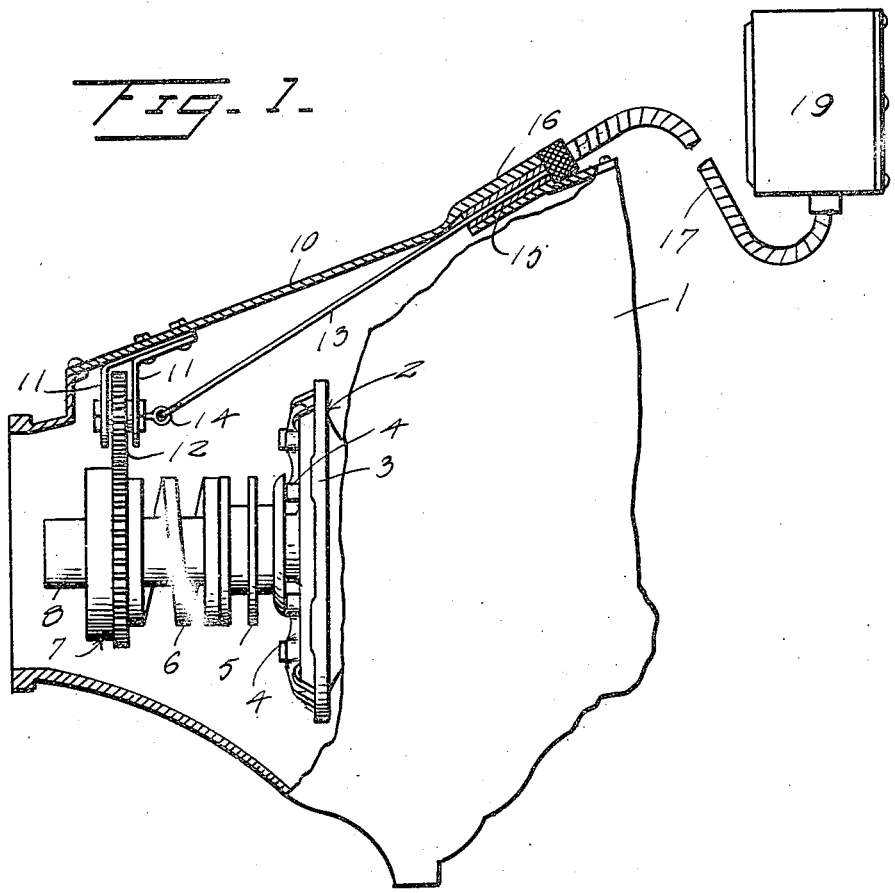
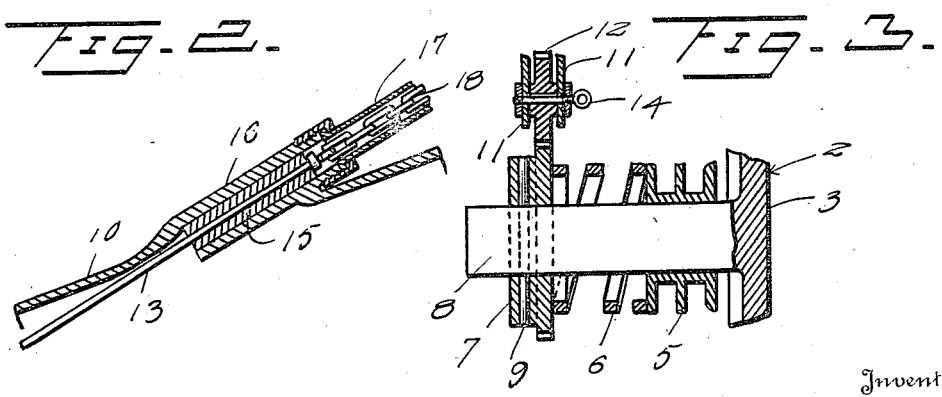
Inventor
D. H. Nash
By
Attorney Patented Jan. 30, 1923.

1,443,848

UNITED STATES PATENT OFFICE.

DAVID H. NASH, OF PETERSBURG, VIRGINIA.

TRANSMISSION DRIVE FOR SPEEDOMETERS.

Application filed March 10, 1922. Serial No. 542,813.

*To all whom it may concern:*

Be it known that I, DAVID H. NASH, a citizen of the United States, residing at Petersburg, in the county of Dinwiddie and State of Virginia, have invented certain new and useful Improvements in Transmission Drives for Speedometers; and I do hereby declare the following to be a full, clear, and exact description of the invention, such as will enable others skilled in the art to which it appertains to make and use the same.

This invention relates to new and useful improvements in drives for speedometers especially adapted for use on the type of automobile employing a planetary transmission in its construction and has for its primary object the provision of means whereby the ordinary flexible shaft of a speedometer may be rotated by the transmission and said means being entirely protected from dirt and dust and receiving a thorough lubrication at all times.

Another object of this invention is the provision of a transmission drive for speedometers of the above stated character which will be simple, durable and efficient, and which may be manufactured and sold at a comparatively low cost.

With these and other objects in view, as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:

Figure 1 is a vertical sectional view, illustrating a planetary transmission and its housing with my invention applied thereto, Figure 2 is a detail sectional view, illustrating a coupling for connecting the flexible shaft of the speedometer to the means located within the transmission housing, and Figure 3 is a detail sectional view, illustrating the combined clutch spring support and drive gear.

Referring in detail to the drawing, the numeral 1 indicates a transmission housing in which is located a transmission 2 of the planetary type and which is used in an automobile commercially known as the Ford and comprises a drive plate 3 provided with fingers 4 to engage a clutch shift 5. The clutch shift 5 is engaged by one end of a clutch spring 6, while the other end of the latter engages a clutch spring support 7. In applying my invention to a device of the above stated character, the ordinary clutch spring support is removed and the combined clutch spring support and drive gear 7 substituted in lieu thereof and is secured to the transmission shaft 8 by the pin 9.

The housing 1, at its upper end, is provided with an opening for the purpose of permitting access to the transmission and is usually closed by an ordinary cover plate, and with my invention in use the ordinary cover plate is eliminated and a door 10 is employed in lieu thereof. The door 10 is secured to the housing 1 in a manner similar to the ordinary cover which is eliminated and carries a bracket 11 which supports a gear 12 and the latter meshes with the gear of the combined clutch spring support and drive gear 7. A driving shaft 13 is located in the housing 1 and has one end connected to the gear 12 by a universal joint 14, while the other end of the shaft is supported within a bearing 15 of a coupling 16 carried by the door 10. The coupling 16 is screw threaded for threaded connection with the flexible housing 17 of the speedometer shaft 18 and the latter has the usual connection with the last named end of the driving shaft 13. The speedometer shaft is connected in the ordinary manner to the speedometer 19.

From the foregoing description taken in connection with the accompanying drawing, it should be apparent that a very efficient drive has been provided for a speedometer and which may be connected to the ordinary planetary transmission now employed upon the Ford automobile and that the drive will receive a thorough lubrication at all times owing to the fact that the housing 1 contains lubrication for the transmission and further that said drive will be entirely protected from dirt and dust, consequently increasing the life of the gears.

While I have shown and described the preferred embodiment of my invention, it will be understood that minor changes in construction, combination and arrangement of parts may be made without departing from the spirit and scope of the invention as claimed.

Having thus described my invention, what I claim is:

In combination, a transmission and a housing therefor, having an opening, a clutch spring support and drive gear for said transmission, a door for closing said opening, a coupling carried by said door, a speedometer shaft connected to said coupling, a speedometer connected to said speedometer shaft, a driving shaft connected to the coupling and located in the housing, a bracket carried by the door, a gear journaled to said bracket and in mesh with the combined clutch spring support and drive gear, and a universal connection between the driving shaft and the second gear.

In testimony whereof I affix my signature in presence of two witnesses.

DAVID H. NASH.

Witnesses:
JAMES C. REES, Jr.
ESTHER G. HAISTY.